United States Patent Office 3,470,163
Patented Sept. 30, 1969

3,470,163
METHOD FOR PRODUCING MELAMINE
Russell F. Hazelton, Chesterfield County, Va., assignor to Allied Chemical Corporation, New York, N.Y., a corporation of New York
No Drawing. Continuation-in-part of application Ser. No. 464,689, June 17, 1965. This application June 15, 1967, Ser. No. 646,189
Int. Cl. C07d 55/28
U.S. Cl. 260—249.7     4 Claims

ABSTRACT OF THE DISCLOSURE

An improved method for the production of melamine from urea wherein molten urea is directed to a heating zone having a plurality of heating rods therein, the introduction rate of the molten urea being such so as to cause an increase in heat transfer coefficient to effectuate the commercial production of a high yield of melamine. Melamine is useful in the production of synthetic resins.

Cross references to related applications

This application is a continuation-in-part of my copending application Ser. No. 464,689 filed June 17, 1965, now abandoned, which is a continuation of my application Ser. No. 177,919, filed Mar. 6, 1962, and now abandoned.

Background of the invention

It is known to produce melamine by pyrolysis of urea, and many suggestions have been made for industrial processes based on this reaction. However, various difficulties have been encountered in commercially exploiting this process, due mainly to the severe corrosive effect of the heated urea at the elevated temperatures and pressures required to make the process practical in terms of theoretical yield.

Moreover, the elevated temperatures required and the highly endothermic nature of the reaction cause difficulty in obtaining efficient heat transfer to make the process practical in terms of space-time yield, i.e., yield of melamine per unit space per unit time. This measure of yield is of particular commercial significance because it is related to the potential production from a plant of a given size or capital cost.

Corrosion resistant metals such as titanium have been suggested for reactor construction, but it has been found that these metals begin to lose their strength at temperatures above 400° C., the recommended reaction temperature. Consequently, while overcoming the problem of corrosion the use of these metals has introduced structural difficulties in the designing of a suitable reactor for commercial scale production of melamine. Among the prior art inventions which point up these difficulties are U.S. Patent 2,927,923 and British Patent 639,962 which describe tubular reactors. In such reactors urea is first converted to various intermediates, including infusibles, and melamine is formed from such intermediate products. To prevent plugging of the tubes with infusibles it is necessary to operate at higher pressures than it desirable using the preferred corrosion resistant metals.

Also it has been found that operation of a tubular reactor without plugging is possible only where the reactor contains a single tube. Attempts to use multiple tubes in parallel (necessary for high capacity required in industrial practice) result in alternate plugging and unplugging of tubes; the unplugged tubes carry feed at excessive rates while the plugged tubes may overheat.

"Pot-type" reactors such as that described in U.S. Patent 2,776,284, while overcoming some of the deficiencies of the tubular reactors, require a complex external heating arrangement which is difficult to design from corrosion resistant metals having decreased strength at temperatures above 400° C. In addition the piping and tubing necessarily associated with such a heating arrangement described in said patent would provide possible points of plugging if designed so as to give the high surface-to-volume ratio used in conventional heat exchanger construction. On the other hand if the tubing is made large enough to substantially eliminate the possibility of plugging, heat transfer efficiency is sacrified by the necessarily thicker walls.

Autoclave reactors such as that described in U.S. Patent 2,776,285 have both external and internal heating means to furnish increased surface-to-volume ratio for improved heat exchange. The use of external heating is undesirable because of the thermal stress it puts on vessel walls as well as the fact that where heat flow occurs through a wall, its temperature rises above that for a material not used as a heat transfer surface. This rise in temperature tends to reduce the acceptable design stress in any material, but particularly in the alloys needed for melamine synthesis vessels, thus creating problems in structural design.

I have found that heat transfer is a principal limiting factor in commercial production of melamine from urea, and inadequate or poor heat transfer is believed to be the most important reason that the prior art processes have not been capable of commercialization. It is noteworthy that the prior art teaches away from the application of heat directly to the urea because of the corrosion problem. It will be shown hereinafter that such prior art teaching is detrimental with respect to heat transfer and that the corrosion problem involved in applying urea directly to the heating surface can be overcome.

Summary of the invention

It is therefore an object of this invention to provide an improved process for making melamine from urea, which avoids the prior art problems of plugging, corrosion, heat loss, poor heat transfer and structural weakening.

This and other objects are achieved in general by continuously introducing molten urea into the heated portion of a vertical cylindrical shell containing a series of vertical solid-core bayonet electrical heating elements sheathed in corrosion resistant metal and so arranged within said shell as to provide a thermal differential whereby material therein is caused to circulate upwardly in one portion and downwardly in an adjacent portion of said shell, and so disposed as to be parallel to and in close proximity to the path of rising gas bubbles released during the pyrolysis of said urea.

Description of the preferred embodiment

The preferred process of the invention comprises continuously introducing molten urea to the bottom of a vertically elongated reaction vessel having a heated zone maintained at at least about 350° C. by vertical heating rods disposed therethrough, and directing said urea into intimate contact with a hot melt comprising melamine, unreacted urea and reaction by-products in close proximity to and in contact with said heating rods. The molten urea is introduced at a rate of at least 20 pounds/minute/ft.$^2$ of available cross sectional area of said heated zone so that the urea is caused to pyrolize and produce sufficient gases in close proximity to said heating rods to cause a violent agitation of said melt in the area thereof to facilitate a cleansing of the rods of heated melt to result in an increased heat transfer for increasing the space-time yield of the melamine. Moreover, the gases cause the melt to circulate upward through said heated zone, and substantially throughout its circulation therethrough heat is added to the melt so as to continuously pyrolyze the urea to melamine. The gaseous by-products and part of the melamine are removed from the upper portion of the reaction vessel, and the remaining part, consisting of a substantially gaseous free, relatively denser material, is recirculated to the lower portion of said reaction vessel with the aid of downward thermal flow into a relatively cooler zone remote from said heating rods. The recirculated part of melamine from said cooler zone is introduced into said heated zone, and the pressure on said circulating melt is maintained at at least 2000 p.s.i.g.

The molten urea is injected into the reaction mixture at a rate of at least about 20 pounds/minute/ft.$^2$ of available cross sectional area of the heated zone and against the heating surface to obtain a heat transfer coefficient of at least about 240 B.t.u./hr./ft.$^2$ of heating surface/° F. difference between the temperature of the heating surface and the temperature of the reaction mixture. Desirably, the molten urea is injected at a rate of about 35–70 pounds/minute/ft.$^2$ of available cross sectional area of the heated zone, or at even higher rates, to obtain greater space-time yields of melamine.

It might be expected that operation of the proposed process at the indicated higher urea input rates would adversely affect the conversion of the urea to melamine. Surprisingly, however, the heat transfer coefficient increases in almost straight line relationship with increasing urea feed rate so that ample heat is furnished and the product contains at least 90 weight percent melamine. Unexpectedly, such heat transfer has now been discovered to be essential for the commercial production of melamine from urea.

A further understanding of the nature and objects of the invention will be had from the following description and examples.

Example I

Example I shows that heat transfer coefficient increases in almost straight line relationship with increasing urea feed rate expressed in terms of pounds of urea injected per minute per square foot of cross section of the heated portion of the reaction mixture.

The reactor used in this example was similar to that disclosed in my U.S. Patent 3,271,116 constructed of Hastelloy C, which is known to be highly resistant to corrosion. The reactor used was three inches in interior diameter and thirty-five inches in internal height. Normal liquid depth was thirty-one inches. Draft tube was two inches in diameter and twenty-nine inches in length with ⅝-inch legs at the base. A tube four inches in length extended downward from the top of the reactor for product withdrawal. The heating bayonet, located inside the draft tube, was 0.8 inch in diameter and extended about twenty-eight inches into the reactor. Urea was fed at the base of the bayonet, inside the draft tube.

At start of the test, the reactor was still hot (about 400° C.) from a preceding run but was empty. Urea flow was started at a slow rate which would fill the reactor in about 200 minutes. Reactor and contents were maintained at about 400° C. during filling of the reactor. Pressure was adjusted to 2,000 p.s.i.g. After 215 minutes, melamine was being prepared at a slow rate and circulation in the reactor was well established.

After reactor start-up, the urea feed rate was varied over a wide range to show effect on heat transfer. All tests were made at about 2,000 p.s.i.g. reactor pressure. Product was satisfactory in all tests and contained at least 90 weight percent melamine. The following table shows effect of urea feed rate.

| Urea feed rate, pounds/minute/sq. ft. cross section of heated zone of reactor: | Heat transfer coefficient, B.t.u./hr./sq. ft. of heating surface/° F. |
|---|---|
| 6.2 | 132 |
| 8.3 | 145 |
| 12.5 | 180 |
| 15.8 | 215 |
| 21.6 | 248 |

It will be seen from the above data that heat transfer coefficient increased in almost straight line relationship with increasing area feed rate. This is attributed to the agitation of the reaction mixture adjacent to the heater by gases given off from the reacting urea.

Example II

Molten urea is pumped to the reactor about ½ rate or about 4 gallons per minute for a 22-inch diameter, 16-foot reactor having a draft tube of about 8⅛ inches interior diameter and 105 bayonet-type heating rods of about ¾-inch outside diameter in the annulus, the available cross sectional area of the annulus being about 2 ft.$^2$. During start-up, the reactor heaters are set for 380° C. maximum. As soon as the liquid reaches the top of the draft tube, circulation begins. When the level indicator indicates that the liquid level is above the heaters, the temperature controller is reset for 400° C. Filling requires 3 to 4 hours' time. As soon as the product stream emerges through the discharge line, the urea feed to the reactor is increased to the desired rate.

The following tabulations show the compositions of the inlet and exit streams:

INLET FEED

| Component | Weight percent | Mols/hour | Pounds/hour |
|---|---|---|---|
| Urea | 97.1 | 137.85 | [1] 8,271 |
| Melamine | Trace | 0.01 | 1 |
| Ammeline-ammelide | 0.5 | 0.30 | 38 |
| Impurities | 2.1 | 1.75 | 180 |
| H$_2$O | 0.3 | 1.50 | 27 |
| Total | 100.0 | 141.41 | 8,517 |

[1] Equivalent to about 70 lbs./min./ft.$^2$ of available cross-section on the annular portion of the reactor.

REACTOR EXIT

| Component | Weight percent | Mols/hour | Pounds/hour |
|---|---|---|---|
| Melamine | 32.7 | 22.07 | 2,781 |
| Ammeline-ammelide | 2.5 | 1.68 | 214 |
| Impurities | 0.7 | 0.61 | 63 |
| NH$_3$ | 28.0 | 141.63 | 2,408 |
| CO$_2$ | 36.1 | 69.84 | 3,073 |
| Total | 100.0 | 235.83 | 8,539 |

As molten urea is heated above 350° C., it passes through various infusible intermediate stages in its conversion to melamine. It is established that these intermediates are responsible for the plugging and corrosion which caused so much difficulty in the prior art. Plugging and excessive corrosion are avoided in the present invention in the following manner:

As molten urea is fed into the reactor, the reactant is distributed in liquid melamine (which is relatively non-corrosive) in the annulus between the draft tube and the wall of the reactor. The annular space contains the electrical heating elements which supply the heat required for rapid pyrolysis of urea to melamine. The urea is dispersed evenly into the mass of circulating liquid melamine and is converted into melamine on absorption of heat. This method of operation avoids high local concentrations of insoluble or corrosive intermediates.

As stated above, the molten urea is directed to the bottom of the heated zone and into close proximity to and in contact with the heating surfaces to obtain maximum heat transfer with corresponding high space-time yields of melamine. It is important to direct the urea into contact with the heating surfaces to cleanse the surface of heated material, i.e., the gases given off by the reacting urea tend to scrub or wipe the heating surface clean of heated material so that this heated material may be quickly and continuously replaced with relatively cooler material. With increased urea feed up to 70 pounds/minute/ft.$^2$ of available cross sectional area of the heated zone, the heat transfer is increased without detrimental effect on the yield of melamine as a percent of theoretical yield. Moreover, the space-time yield is greatly increased as compared with prior art processes in which urea is fed into molten melamine and out of contact with heating surfaces.

It is to be understood that changes in the aforedescribed method steps may be made without departing from the spirit of our invention; and that all exemplifications and variants of my novel method, set forth hereinabove, are intended to be illustrative only, and in no sense limitative of the invention other than as the same is defined in the accompanying claims.

I claim:

1. A process for the production of melamine from urea which comprises:

continuously introducing molten urea to the bottom of a vertically elongated reaction vessel having a heated zone maintained at at least about 350° C. by vertical heating rods disposed therethrough, directing said urea into intimate contact with a hot melt comprising melamine, unreacted urea and reaction by-products in close proximity to and in contact with said heating rods, maintaining the introduction of said molten urea at a rate of at least 20 pounds per minute per square foot of available cross section of said heated zone, thereby causing said urea to pyrolize and produce gases which rise in close proximity to said heating rods resulting in a violent agitation of said melt in the area thereof to facilitate a cleansing of the rods of heated melt to produce a maximum heat transfer for relatively increasing the space time yield of the melamine, said gases further causing the melt to circulate upward through said heated zone, and substantially throughout its circulation therethrough adding heat to said melt so as to continuously pyrolize the urea to melamine, removing part of the melamine and gaseous by-products from the upper portion of said reaction vessel, recirculating the remaining part, consisting of a substantially gaseous free, relatively denser material than said part removed, to the lower portion of said reaction vessel by downward flow into a relatively cooler zone remote from said heating rods, introducing the recirculated part from said cooler zone directly into the heated zone, and maintaining pressure on said circulating melt of at least 2000 p.s.i.g.

2. The process of claim 1 wherein the rate of introducing said molten urea preferably ranges from about 35–70 pounds per minute per square foot of available cross section of said heated zone.

3. The process of claim 2 wherein the urea is directed against the heating surface of the rods so as to obtain a heat transfer coefficient of at least about 240 B.t.u. per hour per square foot of heating surface per degree Fahrenheit difference between the temperature of the heating surface and the temperature of the reaction mixture.

4. The process of claim 3 wherein a relatively increased introduction rate of urea causes a relatively increased heat transfer coefficient thereby resulting in the production of a product containing at least 90 weight percent melamine.

References Cited

UNITED STATES PATENTS

| 2,776,284 | 1/1957 | Hood | 260—249.7 |
| 2,776,285 | 1/1957 | Dyer | 260—249.7 |
| 3,271,116 | 9/1966 | Hazelton | 260—249.7 |

HENRY R. JILES, Primary Examiner

JOHN M. FORD, Assistant Examiner